UNITED STATES PATENT OFFICE.

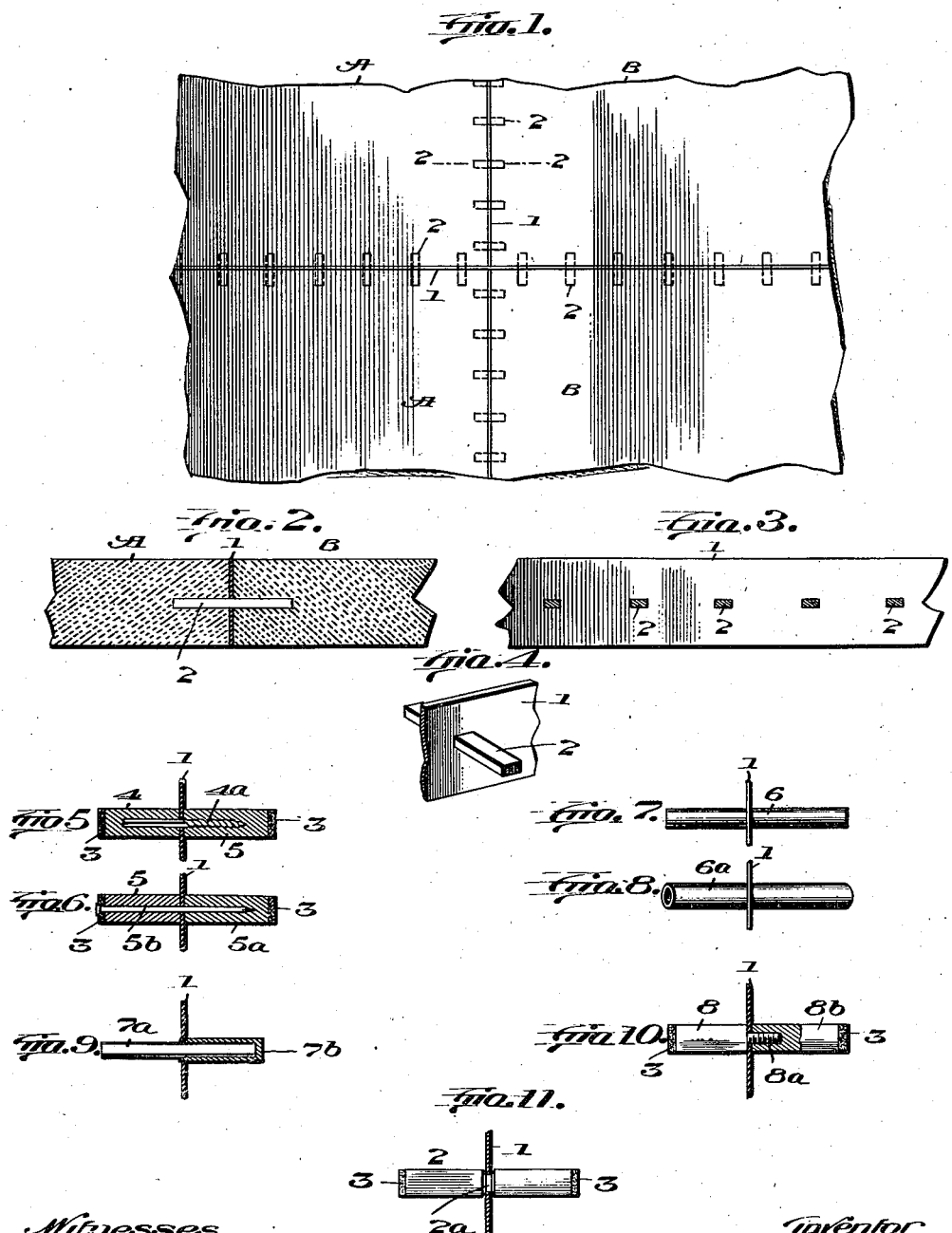

LEWIS R. FERGUSON, OF PHILADELPHIA, PENNSYLVANIA.

JOINT-FILLER FOR CONCRETE PAVING.

1,223,045.   Specification of Letters Patent.   Patented Apr. 17, 1917.

Application filed July 29, 1916. Serial No. 112,093.

*To all whom it may concern:*

Be it known that I, LEWIS R. FERGUSON, a citizen of the United States, residing at Philadelphia, in the county of Philadelphia and State of Pennsylvania, have invented certain new and useful Improvements in Joint-Fillers for Concrete Paving; and I hereby declare that the following is a full, clear, and exact description thereof, reference being had to the accompanying drawings, which form part of this specification.

This invention has reference to pavements made of concrete and the like, and which are usually laid in sections or blocks which vary in size commonly being from 30 to 50 feet long and 10 to 20 feet wide. It is customary to lay such pavements in blocks for the purpose of allowing for expansion and contraction of the blocks without cracking the concrete; and customarily so called "expansion joint fillers" are placed between the blocks so as to slightly separate the same.

There is great difficulty experienced in making the joints exactly perpendicular to the plane of the road slab and consequently when expansion takes place in the slabs there is a tendency for one slab to "crawl" upon the adjoining slab causing unevenness in adjoining slabs. This is particularly true of concrete laid upon a grade.

Trouble is frequently caused in the construction of the pavements by the blocks becoming uneven, or splitting so that the joints become uneven, resulting in rapid deterioration of one or both blocks at such imperfect joints. The object of the present invention is to prevent one block from "crawling" over an adjoining block and to overcome the tendency of the blocks to settle unequally; to keep the joints between the blocks in practical alinement; to facilitate the positioning of the expansion joint fillers, and to hold the joint fillers in place, and to provide means for interlocking the sections together at the joints in such manner, however, as not to seriously interfere with the expansion or contraction of the blocks.

I will explain the invention with reference to the accompanying drawings which illustrate the embodiments thereof and will summarize in the claims the essential features of the invention for which protection is desired.

In the accompanying drawings:

Figure 1 is a detail plan view of part of a joint between two blocks of concrete or like pavement, showing the joint filler and indicating in dotted lines the dowels by which the blocks are interlocked at their edges and the joint filler held in place.

Fig. 2 is an enlarged vertical section on line 2—2 Fig. 1 indicating the preferred form of dowel.

Fig. 3 is a side view of part of a joint filler provided with a series of dowel pins.

Fig. 4 is an enlarged detail view of one of the dowels and a part of the joint filler in which it is applied.

Figs. 5, 6, 7, 8, 9, 10 and 11 are views similar to Fig. 4 showing various modifications of the dowels.

A and B designate parts of adjacent sections or blocks of a concrete or like pavement, between the meeting edges of which is inserted a joint filler 1 such as commonly used in such pavements. This joint filler is preferably made of felt or fiber impregnated with bitumen or other water resisting medium, but it may be made of wood, metal or any suitable material.

Attached to this joint filler 1, at any desired distances apart, are a series of dowels 2 which may be of any suitable size and length, and are preferably inserted through openings in the joint filler, see Figs. 2 and 3. If the concrete or paving is say eight inches in depth, the joint filler would usually be about one-fourth of an inch in thickness, and eight inches in depth and of a length corresponding to the width or length of the joint between the adjacent blocks between which the filler is inserted; in such case the dowel pins might be made about eight inches in length, and of any suitable thickness and width and preferably project about four inches on each side of the filler. These dimensions given are merely approximate for dowels made of wood.

The dowels may be made of any suitable material; if made of wood or plastic material such as fiber they should be impregnated with bitumen or other suitable substance to protect them from water and decay.

The dowels may be of any desired cross section, and they may be either straight or tapered, their cross section or configuration either transversely or longitudinally not being a material feature of the present invention.

If desired the ends of all of the dowels may be provided with cushions or tips 3 of felt or other elastic or semi-elastic medium, preferably impregnated with bitumen, as shown at 3 in Figs. 5, 6, 10 and 11.

As shown in Fig. 5 the dowels may be made of two sections 4 and 5 and united by a screw 4ᵃ, the sections being applied to opposite sides of the filler 1 and the screw 4ᵃ being attached to the section 4 and passing through the filler 1 and engaging the other section 5.

As shown in Fig. 6 the dowel might be made in two sections 5 and 5ᵃ and applied on opposite sides of the filler 1 and united by a nail 5ᵇ driven through one section into the other.

As shown in Fig. 7 the dowel might be formed of a metal rod 6 or of metal pipe as indicated at 6ᵃ in Fig. 8.

As shown in Fig. 9 the dowel might be composed of a rod section 7ᵃ and a pipe section 7ᵇ screwed or otherwise secured onto the filler 1, but preferably screwed as indicated.

As shown in Fig. 10 one dowel section 8 might be provided with a threaded pintle 8ᵃ engaging a threaded socket in the other section 8ᵇ.

As shown in Fig. 11 the dowels might have a central recess or notch 2ᵃ so that when forced through the opening in the filler 1 the dowel could be retained in position in the filler by such notch.

These various modifications are only indicative of the possibilities of variation of the form of the dowels, and other forms will be obvious to those skilled in the art when the invention is once disclosed to them, and can be readily adopted and used, and I have not intended by showing these various modifications to limit myself to any particular construction of the dowels, except as the same may be hereinafter defined in the claims.

The dowels can be conveniently attached to the joint filler at any desired or preferred distances apart, and at any desired depth below the surface and the paving can be molded after the filler is in place; and when the paving or concrete has hardened, the sections are free to contract or expand as in the usual manner but the dowels will keep the adjacent sections in practical surface alinement or surface parallelism and one cannot settle below or rise above the other, and therefore the joints between the sections will be kept in alinement, and practically a smooth surfaced roadway maintained at the joints, and the sections preserved from deterioration at the joints.

What I claim is:

1. In combination with paving sections, a pliable strip constituting an expansion joint filler intermediate the sections, and a plurality of dowels arranged at frequent intervals along the length of the joint and engaging the adjacent paving sections at the joint and embedded in the said sections during the forming thereof, substantially as described.

2. In combination with paving sections, a joint filler, and a series of dowels connected with the joint filler and projecting into both of the adjacent paving sections and embedded in the said sections during the forming thereof, substantially as described.

3. In combination with concrete paving sections, a joint filler interposed between the adjacent surfaces of said sections to compensate for the movements of said surfaces to or from each other, and means connected with said filler and projecting from opposite sides thereof and embedded in the adjacent sections to prevent said sections being projected out of alinement with each other.

4. In a pavement, the combination of concrete paving sections, a joint filler intermediate the sections and provided with a plurality of apertures therethrough substantially at the transverse center thereof, and a plurality of dowels projecting through said apertures and embedded within the contiguous portions of the adjacent sections, to maintain said sections, said joint filler, and said dowels in interlocked relation with each other.

In testimony that I claim the foregoing as my own, I affix my signature.

LEWIS R. FERGUSON.